(12) United States Patent
Sarkar et al.

(10) Patent No.: US 6,903,157 B2
(45) Date of Patent: Jun. 7, 2005

(54) THICKENED AQUEOUS COATING COMPOSITIONS CONTAINING FILM-FORMING POLYMERIC BINDER

(75) Inventors: Manish Sarkar, Widmer End (GB); Stephane Patrick Belmudes, Adlestone (GB)

(73) Assignee: Imperial Chemical Industries PLc (GB)

( * ) Notice: Subject to any disclaimer, the term of this patent is extended or adjusted under 35 U.S.C. 154(b) by 290 days.

(21) Appl. No.: 09/907,647

(22) Filed: Jul. 19, 2001

(65) Prior Publication Data

US 2002/0151643 A1 Oct. 17, 2002

(30) Foreign Application Priority Data

Feb. 7, 2001 (GB) .............................. 0102943

(51) Int. Cl.⁷ .............................. C08L 37/00
(52) U.S. Cl. ................ 524/515; 525/131; 526/318.5; 526/318.6; 528/295.3; 524/558; 524/502
(58) Field of Search .......................... 526/318.5, 318.6, 526/515; 525/131; 524/558, 502; 528/295.3

(56) References Cited

U.S. PATENT DOCUMENTS

| | | | |
|---|---|---|---|
| 5,164,449 A | * | 11/1992 | Nicks .......................... 525/131 |
| 5,292,843 A | * | 3/1994 | Jenkins et al. ............. 526/318.5 |
| 5,422,394 A | * | 6/1995 | Taylor et al. ................ 524/558 |
| 5,504,123 A | * | 4/1996 | Partan, III ..................... 524/42 |
| 5,859,135 A | * | 1/1999 | Doomen et al. ............. 525/123 |
| 6,090,195 A | * | 7/2000 | Andersen et al. ....... 106/162.51 |

FOREIGN PATENT DOCUMENTS

GB        1 223 552 A        2/1971

* cited by examiner

*Primary Examiner*—David W. Wu
*Assistant Examiner*—Henry Hu
(74) *Attorney, Agent, or Firm*—Kenneth J. Stachel

(57) ABSTRACT

A thickened aqueous coating composition (preferably paints and the like or adhesives) containing a film-forming polymeric binder which produces dried coatings having less sensitivity to water by using a thickener which is autoxidisable. Preferred autoxidisable moieties are provided by derivatives of long chain fatty acids of the type used in alkyd paints and association is the preferred thickener mechanism. The moieties may form part of a compound which can take part in a copolymerisation to form a polymeric backbone for the thickener and if the compound is not very soluble in water, the copolymerisation mixture is subjected to intensive agitation to form droplets of less than 500 nm which compensates for the lack of solubility. The thickener may serve as its own binder if sufficient amounts are used.

18 Claims, 3 Drawing Sheets

Tall Oil Fatty Acid Ester

Tall Oil Fatty Acid Ester

THICKENED AQUEOUS COATING COMPOSITIONS CONTAINING FILM-FORMING POLYMERIC BINDER

This invention relates to a thickened aqueous coating composition containing film-forming polymeric binder and a macromolecular thickener. It also relates to a to a macromolecular thickener for use in the composition and to a polymerisable compound for use in making the thickener. Thickened aqueous coating compositions are commonly used in coating surfaces found in buildings where the surfaces are usually coated at ambient temperatures of say 5 to 40° C. using for example brushes, rollers, pads or sprays as the application tools. Such compositions are often called "architectural" coating compositions and they include paints, lacquers, varnishes, woodstains and adhesives. Thickening a coating composition facilitates its loading onto application tools and its subsequent application onto architectural surfaces.

A thickened aqueous coating composition usually contains not only macromolecular thickener, water and a polymeric binder, but also solid particulate non-binder solids such as inorganic and/or organic pigments or opacifiers (for example rutile titanium dioxide or polymeric organic particles containing voids) or extenders (for example chalk, dolomite, clays or talc) as well as other optional ingredients such as matting agents (for example silica), structuring agents (for example titanium or zirconium chelates or laponite or bentonite clays), coalescing solvents (for example moderately volatile alcohols such as benzyl alcohol or hydrocarbons such as white spirit), antifoaming agents and biocides. After a thickened aqueous coating composition has been applied to a surface, it will dry and lose water whereupon the binder forms a film which binds together the remaining ingredients of the composition and the film bonds to the surface to form a dried coat on the surface.

A problem with dried coats obtained from thickened compositions is that residual thickener in the coat introduces a degree of water-sensitivity which manifests as a reduced so-called "wet wipe-resistance" together with a tendency for the dried coat to soften when wet which problem will be called "wet-softening". For this reason, thickener concentrations are usually kept below 2 wt %. The problem is especially troublesome if the dried coat has been obtained from a fluid coating composition in which the volume of particulate solid material is below 30 vol % (based on the total volume of the fluid coating composition) and especially when the volume of the binder in the composition is below 20 vol %. This is because amounts of thickener well above 3 wt % are needed to give the coating compositions viscosities which are high enough for practical use. The problem is further aggravated if the dried coat contains a high volume percentage of particulate non-binder solids for such dried coats are less strongly bound and so are more sensitive to water. The volume percentage of non-binder particulate solids in a dried coat is conventionally called "Pigment Volume Content" or "PVC" even though solids other than pigments may be involved. Serious water-sensitivity arises in conventional dried coats if the PVC is above 70%.

Thickeners inevitably introduce further water-sensitivity into a dried coat because they are necessarily hydrophilic materials as will be explained towards the end of the following brief review of their usefulness in architectural coating compositions. A good account of thickeners and the closely related materials often known as "rheology modifiers" is given by G D Shay in Chapter 30 (headed "Thickeners and Rheology Modifiers") of the book "Paint and Coating Manual: 14$^{th}$ Edition of the Gardner-Sword Handbook" edited by J V Koleske and published in 1995 by ASTM of Philadelphia. The contents of this Chapter 30 are herein incorporated by reference. The distinction between "thickeners" and "rheology modifiers" is somewhat arbitrary and so for the purposes of this Specification, the term "thickener" will be used to include "rheology modifier" too. Shay describes "rheology modifiers" as "inefficient thickeners" which have to be used in concentrations of over 18 g/liter (i.e. over 1.8 wt %) if a useful thickening effect is needed.

Shay explains that architectural coating compositions need to have viscosities which are high enough under all rates of shear, namely under high shear rates of over 1000/sec, moderate shear rates of from 10 to 1000/sec and low shear rates of below 10/sec. In the field of architectural coatings, viscosity is conveniently measured at 18° C. using a concentration of 2 wt % thickener based on the combined weight of water and thickener. A suitable high shear rate viscosity enables the coating compositions to be applied by brush, roller or pad in thicknesses which allow the resulting dried coat to hide blemishes on a surface and so minimise the need for further coatings to be applied. Preferably the high shear rate viscosity should be from 0.05 to 0.25 Pa.sec when measured by an ICI Cone and Plate viscometer as described in ASTM Test D 4287-88, the contents of which are herein incorporated by reference.

A moderate shear rate viscosity facilitates mixing and pumping operations during the manufacture of the coating composition and also gives them a so-called "consistency" which appeals subjectively to many users. Preferably the moderate shear rate viscosity should be from 0.1 to 2.0 Pa.sec when measured by a Sheen Rotothinner viscometer as described in the Sheen Data Sheet called "Sheen/ICI Rotothinners" available from Sheen Instruments Ltd of Kingston on Thames, England. The contents of this Data Sheet are herein incorporated by reference.

A low shear rate viscosity inhibits settling of solid ingredients when the coating compositions are being stored. Secondly, the low shear rate viscosity reduces the risk of liquid coating compositions flowing down vertical surfaces to which they have just been applied. Such flow creates a disfiguration known as "sagging". Thirdly, it enables large amounts of coating composition to be loaded onto a tool such as a brush or roller. Preferably the low shear rate viscosity should be from 20 to 150 Pa.sec when measured by a Brookfield viscometer as described in ASTM Test D2196 using Spindle No. 3 at a rotation speed of 12 rpm. The contents of ASTM Test D2196 are herein incorporated by reference.

Most formulations of film-forming polymeric binders and particulate solids in water do not have a sufficiently high viscosity under one or more of the shear rate conditions discussed above. This is particularly true if the fluid coating composition contains less than 30% by volume of solid materials and especially if it contains less than 20% of binder. Therefore, as reported by Shay, the viscosities of the formulations are conventionally increased by the addition of from 3 to 18 g of a thickener per liter of coating composition, i.e. concentrations off 0.3 to 1.8 wt %. According to Shay, the increase in viscosity is caused by broadly one of three mechanisms operating either alone or in combination. The three mechanisms are known as "hydrodynamic", "flocculative" and "associative". All three comprise interactions which involve macromolecules containing polymeric backbones having high weight average molecular weights of over 30 000 and preferably over 50 000.

Viscosities at all three shear rates can be conveniently measured together using a "Carri-Med" CSL 100 rheometer as supplied by TA Instruments Limited of Leatherhead, England.

The hydrodynamic mechanism is the primary mechanism employed by traditional macromolecular thickeners such as the gums, cellulose derivatives, polyethoxylates, polyacrylamides, polyvinyl alcohols and others listed by Shay in his Table 2. The mechanism requires a water-sensitive macromolecular thickener comprising a high molecular weight hydrophilic backbone devoid of any significant hydrophobic character. On adding the thickener to water, its hydrophilic backbones uncoil and occupy a large hydrodynamic volume in the solution so immobilising large volumes of water and thereby creating a substantial increase in viscosity.

The flocculative mechanism is a mechanism also employed by traditional thickeners comprising high molecular weight hydrophilic backbones which are water-sensitive and devoid of significant hydrophobic character. In this mechanism, the hydrophilic nature of the thickener causes it to concentrate with the water into predominantly aqueous regions of the coating composition whilst particles of polymeric binder form and concentrate in predominantly hydrophobic regions. The concentrated binder particles touch each other and form flocs which impede flow and thereby substantially increase the viscosity of the coating composition.

The associative mechanism requires a more recent type of thickener known as an "associative thickener" such as those listed by Shay in his Tables 4 and 5. Like traditional thickeners, associative thickeners are macromolecular and must be water-sensitive (or capable of being made water-sensitive by a simple change in pH) and they must contain a high molecular weight backbone having hydrophilic character. However, in associative thickeners, the hydrophilic moieties are adjacent to hydrophobic moieties sometimes called "hydrophobic modifications". When the associative thickener is added to an aqueous coating composition, the hydrophilic moieties attract large volumes of water whilst the hydrophobic moieties associate with like moieties on other backbone chains and/or they associate with hydrophobic moieties on hydrophobic particles in the composition such as particles of binder or pigment, opacifier or extender. This association creates three-dimensional networks which are bulky and entrap large volumes of water thereby impeding flow and causing a substantial increase in the viscosity of the coating composition.

It will be seen from the above review that the presence of hydrophilic character is essential to the mechanism by which thickeners thicken aqueous coating compositions. This means that the presence of hydrophilic residues is inevitable in dried coats obtained from thickened coating compositions which explains why the use of thickeners has hitherto been inevitably linked with an increase in the water-sensitivity of the dried coats. As already mentioned, the problem is especially acute if the dried coats have been obtained from fluid coating compositions containing less than 30 vol % of particulate solids and more so if they also contain less than 20 vol % of binder and that this is particularly so if the dried coat has a high PVC, for example a PVC of above 70%.

An object of this invention is to provide thickened aqueous coating compositions containing a macromolecular thickener and a film-forming polymeric binder which compositions produce dried coats of less water-sensitivity and so can tolerate larger concentrations of thickener. Another object is to provide thickened coating compositions containing low volumes of solid materials, especially binder which can nevertheless give dried coats having a PVC of over 70% and which have adequate resistances to wet-wiping and wet-softening. A related object is to provide a thickener for use in such coating compositions and a polymerisable compound for use in making the thickener. A further object it to provide a thickener which can in some circumstances also serve as the polymeric binder so avoiding the need for the coating composition to contain a separate polymeric binder.

Accordingly, this invention provides a thickened aqueous coating composition of a chosen pH which contains a polymeric binder and a macromolecular thickener a) which thickener contains macromolecules having moieties which are hydrophilic at the chosen pH and b) which thickener on dispersion in water at a concentration of 2 wt % (based on the combined weights of the thickener and water) has a low shear viscosity of at least 0.1 Pa.sec (preferably 1 to 20 Pa.sec) when measured at 18° C. on a Brookfield viscometer using a No. 3 Spindle rotating at 12 rpm wherein the macromolecules also contain autoxidisable moieties thereby creating an autoxidisable thickener. The compositions may contain over 3 wt % (often even over 10 wt %) of thickener and still give dried coatings which are not unduly water-sensitive.

"Autoxidisable moieties" are moieties which can react with oxygen at ambient temperatures usually in the presence of catalyst known as a "drier" to produce crosslinks to other oxidisable moieties on adjacent like macromolecules. Autoxidation is the process by which conventional solvent borne alkyd paints form dried coats having amongst other things good wet-wipe and wet-softening resistances. It has now been found that autoxidation can likewise confer wet-wipe and wet-softening resistances on dried coats obtained according to this invention including those having a PVC of over 70% and/or obtained from fluid coating compositions containing only low volumes of solid particulate materials. A good account of the way in which alkyd paints oxidise is given on pages 156 to 160 of the book "Introduction to Paint Chemistry" by GPA Turner published in 1988 by Chapman and Hall of London. The contents of these pages are herein incorporated by reference. It should be explained that this type of oxidation is also known as "drying" even though the oxidation mechanism itself does not depend on the loss of liquid by volatilisation. Turner illustrates autoxidisable moieties which comprise ethylenic double bonds and "driers" which are soaps of polyvalent metals such as for example the octoates or naphthenates of cobalt or manganese and which catalyse the autoxidation reaction. Zirconium soaps are also used as driers. Driers are used in concentrations of up to 1 wt % of the coating composition.

Autoxidation may be accelerated by the presence of easily oxidised compounds and especially highly polyunsaturated compounds such as maleinised polybutadiene where the polybutadiene moieties have a weight average molecular weight of from 3 000 to 7 000 and where the maleic moieties provide dispersibility in water. Preferably the coating composition contains from 0.1 to 1 wt % of these easily oxidised compounds.

Autoxidisable moieties may be obtained from a wide variety of unsaturated materials, but those most commonly used in alkyd paints are long chain unsaturated fatty acids containing from 12 to 30 carbon atoms and produced by the hydrolysis of naturally occurring unsaturated oils. A list of such fatty acids is provided on pages 215 and 216 of Volume 1 of the book "Outlines of Paint Technology" by W M Morgans and published in 1982 by Griffin of London and the contents of these pages are herein incorprated by reference. Amongst the commercially more important acids listed by Morgans are linseed oil fatty acid, soya bean oil fatty acid, safflower and sunflower oil fatty acids and tall oil fatty acid. In making autoxidisable alkyd polymer binders, the unsaturated fatty acids are attached to a polyester backbone by reaction with functional groups bonded to the backbone. An analogous technique can be used to introduce autoxidisable moieties into thickener macromolecules provided means can be found to attach the unsaturated fatty acids to the macromolecule and preferably to its polymeric backbone. Such use of long chain fatty acids also has the advantage of introducing hydrophobic moieties into the thickener providing it with means for use in associative thickening mechanisms.

A most preferred technique for introducing the autoxidisable groups involves taking a copolymerisable compound containing a derivative of the long chain unsaturated fatty acid and copolymerising it with other monomers used in the production of the thickener macromolecules. Some of these other monomers will have moieties which are hydrophilic at the pH chosen for the coating composition. In effect, the copolymerisation creates a macromolecule having a backbone which contains hydrophilic moieties adjacent to hydrophobic derivatives of the long chain fatty acid which depend from the backbone. A reaction scheme for this type of coplymerisation is shown in FIG. 1 of the drawings. Preferably, the copolymerisable compound containing the fatty acid derivative should comprise from 2 to 30 wt % (and especially 4 to 15 wt %) of the monomers which are copolymerised to create the macromolecules of the thickener. Generally the monomers containing the hydrophilic moieties should comprise from 10 to 40 wt % (especially from 20 to 40%) of the monomers copolymerised to create the macromolecules.

Preferred copolymerisable compounds containing the fatty acid derivative are the esters of the derivative with an unsaturated carboxylic acid such as acrylic, methacrylic, crotonic or itaconic acids or an anhydride such as maleic or succinic anhydrides.

Conveniently available co-monomers for use in forming the remainder of the polymeric backbone include alkyl esters of unsaturated carboxylic acids such as the methyl, ethyl, butyl and 2-ethylhexyl esters of acrylic or methacrylic acids, vinyl esters such as vinyl acetate or vinyl "Versatates"[1], α-olefins such as ethylene, propylene or butene-1 and styrene or its homologues. Copolymerised styrene and its homologues have the additional advantage of being particularly active in generating and coupling to free radicals and so they promote the autoxidation process which in turn accelerates the onset of water-resistance.

[1] Vinyl "Versatate" is the vinyl ester of so-called "Versatic" acid which is a mixture of aliphatic monocarboxylic acids each containing an average of 9, 10 or 11 carbon atoms and is commercially available from the Shell Chemical Company of Carrington, England.

The hydrophilic character which is essential to the thickening mechanisms may be provided by co-monomers containing hydrophilic moieties such as hydroxyl or ionic moieties. Examples of co-monomers which can provide hydroxyl groups include hydroxyethyl acrylate or vinyl acetate after it has been subsequently hydrolised to give a notional copolymerised vinyl alcohol. Other co-monomers such as carboxylic acids or their anhydrides or amides can introduce hydrophilic character provided that an appropriate pH is chosen for the coating composition. Choosing a pH above 7 converts carboxylic groups in the copolymerised carboxylic acids or anhydrides into hydrophilic carboxylate anions. Again, suitable carboxylic acid/anhydrides include acrylic, methacrylic, crotonic or itaconic acids or maleic or succinic anhydrides. Likewise choosing a pH below 7 converts amino and amido groups in copolymerised amino/amides to hydrophilic anions. Suitable amino/amide co-monomers include dimethylaminoethyl or tertiarybutylaminoethyl methacrylates or acrylamide or methacrylamide. Sodium acrylamidopropane sulphonic acid is an example of a co-monomer which can be given either an anionic or a cationic hydrophilic character.

The copolymerisable compound containing the fatty acid derivative may be the diester formed by reacting the long chain fatty acid with the oxirane group in a glycidyl unsaturated carboxylate such as glycidyl acrylate or methacrylate. Such a reaction produces a hydroxypropylene diester comprising unsaturated long chain fatty acid derivative linked to an unsaturated carboxylate by the divalent hydroxypropylene group. The unsaturation in the unsaturated carboxylate is then available for copolymerisation with the other monomers to form the backbone of a thickener macromolecule whilst the unsaturation in the dependant long chain fatty acid derivatives renders the thickener autoxidisable.

Hydroxypropylene diesters of unsaturated derivatives of long chain fatty acids and carboxylates have the advantage of being relatively easily available but they also suffer the disadvantage of having a very low solubility in water which inhibits their activity in conventional aqueous copolymerisation processes unless environmentally unwelcome amounts of organic co-solvent are also present. It has been discovered that this problem can be solved by stirring the co-monomers (including the diester) together with water and surfactant and then subjecting the stirred mixture to intensive agitation sufficient to create a very large number of very small (less than 500 nm in diameter) droplets of co-monomer. A minimal degree of copolymerisation can be initiated in the water phase but then the copolymerising system will migrate into organic zones created by the droplets and migration will be quick because it is favoured by the high surface area provided by the very large number of very small droplets of co-monomer. This migration permits copolymerisation to be initiated in the aqueous phase and then overcomes the inhibition of the copolymerisation arising from the insolubility of the diester in water. The most preferred diester comprises methacrylate moieties and moieties derived from tall oil fatty acid. The required intensive agitation may be provided by mechanical emulsifiers such as a Ross 100 (available from Ross and Son, Hauppauge, N.Y., USA) or a Silverson or an IKA emulsifier (available from IKA-Works Inc, Cincinnati, Ohio, USA). Alternatively, a Sonolator (available from Sonic Corp, Stratford, Conn., USA) may be used which employs ultrasound to generate the required shear. Preferably, agitation is sufficiently energetic to produce eventual particles of thickener which have a number average particle size of below 500 nm and preferably below 300 nm.

A more hydrophilic diester would have the twin advantages of being capable of a purely aqueous emulsion copolymerisation without the need for intensive agitation and greater efficiency as a thickener. One way to increase water solublity of the water-soluble diesters is to introduce hydrophilic character into otherwise hydrophobic groups pendant from the polymeric backbone. This can be conveniently done by linking the fatty acid derivatives to the unsaturated carboxylate by means of a polyethoxylate or similar polyether divalent radical instead of by the hydroxyethylene divalent radical used above.

Alternative techniques for obtaining useful diesters involve alcoholysis followed by an esterification or transesterification. Preferred techniques comprise the alcoholysis of an unsaturated triglyceride by a polyol which is usually a diol. The alcoholysis converts the triglyceride to a mixture containing mono- or di- glycerides which contain respectively two or one hydroxyls whilst at least some of the polyol is converted to an ester containing at least one hydroxyl. These hydroxyls provide means for bonding the esters to monomers copolymerisable with the other co-monomers which copolymerise to produce the thickener macromolecule. Preferred triglycerides are the oils used as a source of the unsaturated long chain fatty acids mentioned above, especially linseed oil, soya bean oil, safflower seed oil, sunflower seed oil or tall oil. Preferred diols are 1,3 butene diol and neopentyl glycol.

The above hydroxyl containing esters may be bonded to copolymerisable monomers to form a diester by co-reaction with carboxylic acid groups, carboxylic anhydrides or oxirane groups associated with the monomer or by a transesterification. The preferred co-reactants are anhydrides and particularly methacrylic anhydride. Transesterification is preferably performed using $C_{1\ to\ 8}$ alkyl esters of unsaturated carboxylic acids such as the methyl, ethyl, butyl, or ethoxyhexyl esters of acrylic, methacrylic, crotonic or itaconic acids. Both the co-reaction and the transesterification each produce unsaturated diesters useful in making thickener macromolecules. However, the intense agitation technique may need to be employed if the diesters are not very water-soluble.

Other techniques exist for introducing autoxidisable moieties into a thickener macromolecule. For example, the oxirane group of a glycidyl ester of a long chain unsaturated fatty acid may be reacted with a suitably labile hydroxyl group in a cellulosic thickener or a hydroxyl group introduced into a polyether by the presence of small amounts of co-condensed triol or tetrol.

In the field of thickener macromolecules, the polymeric backbone of the macromolecule is generally regarded as being the longest chain of carbon atoms optionally also containing oxygen and/or nitrogen atoms which exists in the macromolecule excluding any primarily hydrophobic side chains. Examples of typical polymeric backbones are shown in FIGS. 2 to 5 of the drawings. Other moieties such as hydrophobic, hydrophilic and especially the autoxidisable moieties may depend from the backbone. The backbone should have a molecular weight average of at least 35 000, preferably at least 50 000 and usually from $10^5\ to\ 10^6$.

In addition to increasing the viscosity of the coating composition and decreasing the water-sensitivity of the dried coats, the thickener may also autoxidise to form a binder film and so if sufficient autoxidisable moieties are present, the thickener may serve as the sole binder. The amount of autoxidisability needed will depend on the PVC of the composition with higher PVC's needing more autoxidisability especially where the PVC exceeds 70%.

This invention also provides an aqueous thickener dispersion of chosen pH for use in coating compositions
  a) which thickener contains macromolecules having moieties which are hydrophilic at the chosen pH and
  b) which thickener on dispersion in water at a concentration of 2 wt % (based on the combined weights of the thickener and water) has a low shear viscosity of at least 0.1 Pa.sec when measured at 18° C. on a Brookfield viscometer using a No. 3 Spindle rotating at 10 rpm
wherein the macromolecules also contain autoxidisable moieties.

This invention further provides an autoxidisable polymerisable compound for use in making a thickener according to this invention wherein the compound is a diester containing a hydroxypropylene divalent radical and moieties which are an unsaturated carboxylate and a derivative of a long chain unsaturated fatty acid.

Procedure for Assessing Wet-Wipe Resistance

The Wet-Wipe Resistance of a dried coat of paint is assessed as follows:

The surface of a board is painted with a matt acrylic paint using a brush and allowed to dry at room temperatures (15 to 20° C.) for 48 hours. The painted surface is then further painted with a brush using the thickened aqueous paint which is to be assessed. The newly painted surface is allowed to dry at room temperatures for one hour and then different samples of the painted surface are stored at room temperatures for periods of one, two, three and four weeks respectively.

After storage, each sample is wiped 20 times with a wet rag and the amount of paint removed is assessed visually and assigned a value according to the following scale:

1=very poor, paint removed within 1–5 wipes.
  3=quite poor, giving soapy sensation at 10 wipes, lots of paint on rag.
  5=poor, giving soapy sensation at 18–20 wipes.
  7=little paint removed, gives no soapy sensation.
  10=no paint removed at all.

The invention is further illustrated by the following Examples of which Examples A to C are comparative.

EXAMPLE 1

Process for the Production of a Copolymerisable Autoxidisable Monomer 500 g of tall oil fatty acid (TOFA), 8 g of cetyl trimethyl ammonium bromide and 0.7 g of hydroquinone were all charged under nitrogen to a one liter round bottom flask fitted with a reflux condenser and a stirrer. The contents of the flask were stirred and heated to 80° C. and then 355 g of glycidyl methacrylate were added gradually over a period of 3 hours whilst a temperature of 80° C. and stirring were maintained. The temperature of 80° C. and the stirring were maintained for a further 9 hours.

During the process, TOFA reacted with oxirane moieties in the glycidyl methacrylate to form a copolymerisable diester in which unsaturated methacrylate moieties were linked to an autoxidisable TOFA carboxylate by a hydroxypropylene divalent group. The reaction was catalysed by the cetyl trimethyl ammonium bromide and premature polymerisation was inhibited by the hydroquinone.

EXAMPLE 2

Alternative Process to that of Example 1

The procedure of Example 1 was repeated except that the catalyst was 11.3 g of tetra-ethyl ammonium bromide, the addition of the glycidyl methacrylate was made over a period of two hours and the temperature of 80° C. and stirring were maintained for a further 3 hours instead of 9.

As in Example 1, the reaction of TOFA and glycidyl methacrylate formed a copolymerisable double ester.

EXAMPLE 3

Alternative Copolymerisable Autoxidisable Monomer having a Greater Hydrophilicity 40 g of a hydroxypolyethoxy tall oil carboxylate and 0.2 g of hydroquinone were charged under nitrogen to a one liter round bottom flask fitted with a reflux condenser and a stirrer. The polyethoxy moiety contained a number average of 6 ethoxy units. The contents of the flask were stirred and heated to 100° C. and then 15 g of methacrylic anhydride were added over a period of one hour. The temperature of 100° C. and the stirring were maintained for a further 3 hours.

During the process, the hydroxypolyethoxy moiety esterified the methacrylic anhydride to form a copolymerisable double ester in which unsaturated methacrylate moieties became linked to tall oil carboxylate by a polyethoxy divalent group. The presence of the polyethoxy link conferred increased hydrophilicity on the double ester as compared with the hydrophilicity of the autoxidisable monomer produced in Examples 1 or 2.

EXAMPLE 4

Process for the Production of an Autoxidisable Thickener which will be Called "Thickener Eg 1"

The following co-monomers and hexanol were mixed together in a glass beaker at ambient temperatures:

| | |
|---|---|
| Ethyl Acrylate | 165 g |
| Methacrylic Acid | 94 g |
| Methyl Methacrylate | 5.6 g |
| Copolymerisable Monomer of Example 1 | 23.5 g |
| Hexanol | 1.35 g |

The mixture was added slowly with stirring to a solution of 2 g of sodium dioctyl sulphosuccinate (SDSS) surfactant in 386 g of water. The new mixture so obtained was subjected to intensive agitation for 10 minutes using a Silverson mixer rotating at high speed whereupon an emulsion was obtained comprising very fine droplets of organic monomers.

The emulsion was gradually pumped over 3 hours into a solution of 0.1 g SDSS surfactant and 2.5 g ammonium persulphate polymerisation initiator in 808.2 g water maintained at 80° C. under nitrogen in a round bottom flask fitted with a reflux condenser and a stirrer. Copolymerisation began and the temperature of 80° C. and stirring were maintained for a further 30 minutes after pumping had been completed. Then a second solution comprising 0.27 g of ammonium persulphate in 2.2 g water was added followed by a second period of 30 minutes at 80° C. with stirring. Lastly, a solution of 0.18 g sodium sulphoxylate formaldehyde in 2 g water was added followed by a final period of 30 minutes at 80° C. with stirring. The contents of the flask were filtered and a latex of paticulate macromolecular thickener was obtained in which the particles had a number average particle size of 314 nm.

The macromolecules contained a backbone consisting of copolymerised acrylate, methacrylate and methacrylic acid moieties which acid moieties confer hydrophilic character on the macromolecules when they experience a change in pH to above 7. Hydrophobic moieties comprising tall oil carboxylate depend from the backbone to which they are connected via a hydroxylene ethylene divalent group. The hydrophilic moieties and their adjacent hydrophobic moieties allow the macromolecules to act as an associative thickener when in solutions of pH above 7 and preferably between 9 to 9.5.

EXAMPLE 5

Autoxidisable Thickener Containing Styrene as Autoxidation Promoter which will be Called "Thickener Eg 2"

The process of Example 4 was repeated but with the following modifications:

1. The mixture of co-monomers and hexanol was as follows:

| | |
|---|---|
| Ethyl Acrylate | 165 g |
| Methacrylic Acid | 92 g |
| Methyl Methacrylate | 6.2 g |
| Styrene | 15 g |
| Copolymerisable Monomer of Example 1 | 26 g |

2. The surfactant solution contained 5 g of SDSS in 386.7 g of water.
3. The initiator solution in the round bottom flask consisted of 0.1 g of SDSS and 2.5 g of ammonium persulphate in 808 g of water.
4. The solution of additional initiator consisted of 0.27 g ammonium persulphate in 2.16 g water.
5. The solution of formaldehyde derivative consisted of 0.18 g of sodium sulphoxylate formaldehyde in 2.07 g water.

The particle size of the dispersion was 220 nm.

The autoxidisable macromolecules could act as associative thickeners when in a solution of pH above 7 and preferably between 9 to 9.5.

EXAMPLE 6

Alternative Associative Thickener having Increased Hydrophilicity which will be Called "Thickener Eg 3"

The process of Example 4 was repeated but with the following modification:

The mixture of co-monomers and hexanol was as follows:

| | |
|---|---|
| Ethyl Acrylate | 68 g |
| Methacrylic Acid | 23.5 g |
| Copolymerisable Monomer of Example 3 | 10 g |
| Hexanol | 0.4 g |

The particles of thickener had a number average particle size of 193 nm and comprised copolymeric autoxidisable macromolecules. Hydrophobic tall oil carboxylates were attached to the backbone via a polyethoxy divalent group which made the macromolecules more water-soluble on increasing the pH to above 7. The macromolecules were able to act as associative thickeners in solutions of pH above 7.

Comparative Example D

Associative Thickener having No Auto-oxidiseable Group which will be Called "Thickener Eg D"

The process of Example 4 was repeated but with the following modification:

The mixture of co-monomers and hexanol was as follows:

| | |
|---|---|
| Ethyl Acrylate | 203 g |
| Methacrylic Acid | 101.7 g |
| Styrene | 15 g |
| Stearyl methacrylate | 33.9 g |
| Hexanol | 1.35 g |

The particles of thickener had a number average particle size of 191 nm. The macromolecules were able to act as non-autoxidisable associative thickeners in solutions of pH above 7.

EXAMPLE 7 TO 10 AND COMPARATIVE EXAMPLES A TO D

Wet-Wipe Resistance of Dried Coats Obtained from Thickened Aqueous Paints

In Examples 7 to 10, thickened aqueous paints were made using autoxidisable associative thickeners as provided by this invention and conventional ingredients all as specified in Tables 1 and 2. Similarly thickened aqueous paints were made up in Comparative Examples A to D except that commercially available non-autoxidative associative thickeners were used in Comparative Examples A to C and thicker aqueous coating compositions to be made when the thickener is autoxidisable as is illustrated by the viscosities shown in Table 4. Table 3 Examples 7 and 8 demonstrate the benefits of incorporating styrene in the macromoleclar thickener. A preliminary pre-storage inspection indicated that the autoxidation of the paint of Example 10 was slow owing to the absence of the unsaturated accelerator.

TABLE 1

INGREDIENTS OF THE PAINT FORMULATIONS

| Ingredient | Examples: Parts by weight | | | | | | | |
|---|---|---|---|---|---|---|---|---|
| | 7 | 8 | 9 | 10 | A | B | C | D |
| Dispersant | 0.3 | 0.3 | 0.1 | 0.3 | 0.5 | 0.3 | 0.3 | 0.3 |
| Biocide | 0.2 | 0.5 | 0.01 | 0.2 | 0.5 | 0.5 | 0.2 | 0.2 |
| Coalescing Solvent | 0.7 | 0.5 | 4.0 | 0.4 | 0.4 | 0.5 | 0.7 | 0.5 |
| Antifoaming Agent | 0.3 | 0.2 | 0.04 | 0.1 | 0.2 | 0.2 | 0.3 | 0.2 |
| Water | 51.0 | 37.5 | 43.3 | 42.6 | 46.3 | 43.7 | 55.1 | 45.7 |
| Chalk | 12.6 | 21.2 | 26 | 19.2 | 20.6 | 21.6 | 12.9 | 19.2 |
| China Clay | 14.0 | 14.8 | — | 16.3 | 14.4 | 15.0 | 14.0 | 16.3 |
| Rutile | 7.4 | 6.1 | 6.4 | 6 | 6.0 | 6.3 | 7.4 | 6 |
| Binder Latex | 5.3 | 5.7 | — | 3.6 | 9.7 | 10.2 | 7.0 | 5.2 |
| Accelerator | .39 | .99 | 0.88 | 0 | — | — | — | 0.5 |
| Cobalt Drier | 0.01 | 0.01 | 0.02 | 0.01 | — | — | — | 0.01 |
| Thickener Eg 1 | 7.6 | — | — | — | — | — | — | — |
| Thickener Eg 2 | — | 11.9 | — | 11.0 | — | — | — | — |
| Thickener Eg 3 | — | — | 19 | — | — | — | — | — |
| Conventional Thickener | — | — | — | — | 1.1 | 1.1 | 1.9 | — |
| Thickener Eg D | — | — | — | — | — | — | — | 5.6 |
| Ammonia | 0.2 | 0.3 | 0.26 | 0.3 | 0.3 | 0.3 | 0.2 | .28 |
| Total | 100 | 100 | 100 | 100 | 100 | 100 | 100 | 100 |

"Thickener Eg D" was used in Comparative Example D. Again the ingredients and amounts used are specified in Tables 1 and 2.

Each paint was made up using the following procedure. The dispersant, biocide, coalescing solvent and antifoaming agent were all dissolved in a 50% portion of the water. The chalk, clay and rutile were added to the solution which was then subjected to high speed dispersion using a "Dispermat" mixer operating at 400 rpm. Meanwhile the binder latex and any accelerator and cobalt drier needed had been stirred into the other 50% portion of the water. The thickener and ammonia were next stirred into this other portion of water and the two portions of water were stirred together to produce the final paint formulation.

Each paint was applied to a surface and allowed to dry for one hour at room temperature to produce a dried coat. The dried coats were then stored at room temperatures for periods of 1, 2, 3 and 4 weeks and after a coat had been stored for one of these periods, its Wet-Wipe Resistance was assessed using the procedure described earlier in this specification.

The assessments and the periods after which they are made are shown in Table 3 together with the PVC of the dried coats and the amount (in parts by weight) of thickener used in the aqueous paint (i.e. before the paint has begun to dry).

Table 3 shows that the use of autoxidisable thickeners substantially increases the Wet-Wipe Resistance of the dried coats even when the PVC of the dried coats exceeds 70% and even when the amount of thickener used exceeds that used for conventional non-autoxidisable associative thickeners by a factor of at least 3 and sometimes over 5. This ability to use much larger amounts of thickener enables Viscosities at increasing and decreasing shear rates were measured using a Cari-Med CSL 100 rheometer. Measurements were made with increasing viscosity (up) and then after a 2 minute pause, with decreasing viscosity (down). The differences between up and down viscosities indicate thixotropy.

TABLE 2

DETAILS OF THE INGREDIENTS

| Ingredient | Details |
|---|---|
| Dispersant | "Calgon": Ellis Everard Ltd of Bradford, UK |
| Biocide | V 189: KMZ Chemicals Ltd of Cobham, UK |
| Coalescing Solvent | "Texanol": Eastman Chemicals (UK) Ltd of Liverpool, UK |
| Antifoaming Agent | "Foamaster" G: Henkel of Madison Heights, MI, USA |
| Binder Latex | "Emultex" 4057: A vinyl/acrylic latex from Revertex Chemicals Ltd of Hartlepool, UK |
| Accelerator | "Lithene": A 25 wt % maleinised polybutadiene of molecular weight 5 000 from Revertex Chemicals Ltd of Hartlepool, UK |
| Thickener Eg 1 | Thickener of Example 4 with monomer from Example 1. |
| Thickener Eg 2 | Thickener of Example 5 with monomer from Example 2. |
| Thickener Eg 3 | Thickener of Example 5 with monomer from Example 1. |
| Conventional Thickener | "Acrysol" DR1 associative thickener: Rohm and Haas (UK) Ltd of Croydon, UK. |
| Thickener Eg D | Thickener of Comparative Example D which includes copolymerised styrene. |

An unexpected benefit is that increased amounts of autoxidisable thickener produced increased Wet-Wipe Resistances whereas an increase in conventional thickener would decrease Wet-Wipe Resistance. It is presumed that this benefit is possible because the increase in autoxidisatility brings an increase in Wet-Wipe Resistance which offsets the decrease which might be expected from an increased amount of hydrophilic moieties.

TABLE 3

ASSESSMENT OF WET-WIPE RESISTANCE
ON A SCALE OF 1 (POOR) TO 10 (GOOD)

| Period after which Assessment Performed | Example and Assessment | | | | | | | |
|---|---|---|---|---|---|---|---|---|
| | 7 | 8 | 9 | 10 | A | B | C | D |
| After 1 week | 6 | 5 | 9 | — | 1 | 2 | 4 | 2 |
| After 2 weeks | 6 | 7 | — | — | 2 | 2 | 4 | 3 |
| After 3 weeks | 7 | 8 | — | — | 3 | 3 | 5 | — |
| After 4 weeks | 8 | 9 | — | — | 3 | 3 | 5 | — |
| PVC of Dried Coat | 74 | 72 | 76 | 77 | 73 | 73 | 74 | 77 |
| Parts by Weight of Thickener in Paint | 7.6 | 11.9 | 19 | 11.1 | 1.1 | 1.2 | 1.9 | 5.6 |

TABLE 4

VISCOSITIES OF THICKENED PAINTS

| Shear Rate | Examples: Shear in Pa.sec | | |
|---|---|---|---|
| Up then Down | 7 | A | B |
| *Low | 172 | 69 | 129 |
| *Medium | 2.32 | 1.95 | 3.7 |
| *High | 0.21 | 0.21 | 0.27 |
| **High | 0.21 | 0.17 | 0.27 |
| **Medium | 2.1 | 1.5 | 3.2 |
| **Low | 106 | 49 | 98 |

*Up
**Down

Low shear=0.1/sec: medium shear=40/sec: high shear=1000/sec

EXAMPLE 11 to 13
Alternative Method for Providing Autoxidisable Thickener using Esterification and Transesterification Firstly, a mixture of autoxidisable hydroxy esters was made by the alcoholysis of soya bean oil (Example 13), safflower seed oil (Example 14) or linseed oil (Example 15). The aloholysis was carried out using 1,3-butene diol.

To make the esters, 300 g of one of the oils were charged under nitrogen to a round bottom flask fitted with a reflux condenser. 1.5 g of lithium neodecanoate were added and the flask and contents were heated to 200° C. for 1 hour. 61.5 g of 1,3-butene diol were added over 5 minutes followed by heating to 240° for 45 minutes. A mixture of autoxidisable unsaturated hydroxy esters was obtained. 300 g of the mixture of esters obtained above were added to 174 g of methacrylic anhydride contained in a round bottom flask fitted with a reflux condenser. 0.1 g of the methyl ether of hydroquinone (MEHQ) were added as a polymerisation inhibitor and the mixture was heated to 100° C. for 3 hours. An autoxidisable monomer mixture was obtained which comprised methacrylate moieties and unsaturated long chain moieties derived from the oil.

The autoxidisable monomer mixture was converted into an autoxidisable associative thickener by a combination of esterification and transesterification performed as follows. A mixture containing the autoxidisable monomer mixture and the following was made up:

| Autoxidisable monomer mixture from above | 30 g |
|---|---|
| Methacrylic acid | 44 g |
| Ethyl Acrylate | 76 g |
| Sodium $C_{14}$ to $C_{18}$ sulphonate | 3 g |
| Water | 200 g |

The mixture was emulsified by subjecting it for 5 minutes to intense agitation provided by a Ross ME-100 Emulsifier operating at 10 000 rpm. 30 g of the emulsion obtained were added to 288 g of water which had been previously heated to 80° C. under nitrogen. The reactants and water were then maintained at 80° C. until the final cooling. 0.8 g of ammonium persulphate in 16 g of water were added to the emulsion in the prior heated water and whole was allowed to stand for 30 minutes. The remainder of the emulsion was added gradually over 2 hours and the whole again allowed to stand for 30 minutes. 0.2 g of t-butyl hydroperoxide was added followed by another 30 minutes stand. Then 0.14 g sodium formaldehyde sulphoxylate in 2 g water was added followed by a 30 minute stand. The last two additions and stands were repeated and then the whole was allowed to cool to ambient temperature. An autoxidisable thickener was obtained which could be used to thicken and bind paint.

EXAMPLE 14
Use of Transesterification
The following mixture was made:

| Autoxidisable monomer of Example 13 | 160 g |
|---|---|
| Ethyl Acrylate | 160 g |
| DER 333 (liquid epoxy resin from Dow) | 3 g |
| Dibutylamine (Air Products) | 1.5 g |
| MEHQ inhibitor | 0.1 g |

The mixture was charged to a round bottom flask fitted with a glass packed column and heated to 125° C. over a period of 2.5 hours whilst ensuring that the head temperature of the column was kept below 80° C. This caused transesterification to occur after which a distillate of 20 ml was collected from the flask which comprised the autoxidisable monomer.

The autoxidisable monomer was used to make an autoxidisable thickener according to the procedure of Examples 11 to 13 but with the following changes:
 1. 7.5 g of the autoxidisable monomer were used,
 2. 7.5 g of methacrylic acid were used and
 3. 40 g of ethyl acrylate were used.
This thickener can be used in paint formulations as described earlier.

This invention is further illustrated by the drawings of which

FIG. 1 shows a reaction scheme for the copolymerisation of a tall oil derivative methacrylate with other ethylenically unsaturated co-monomers to form a backbone carrying pendant hydrophobic tall oil derivatives.

Figure 1:
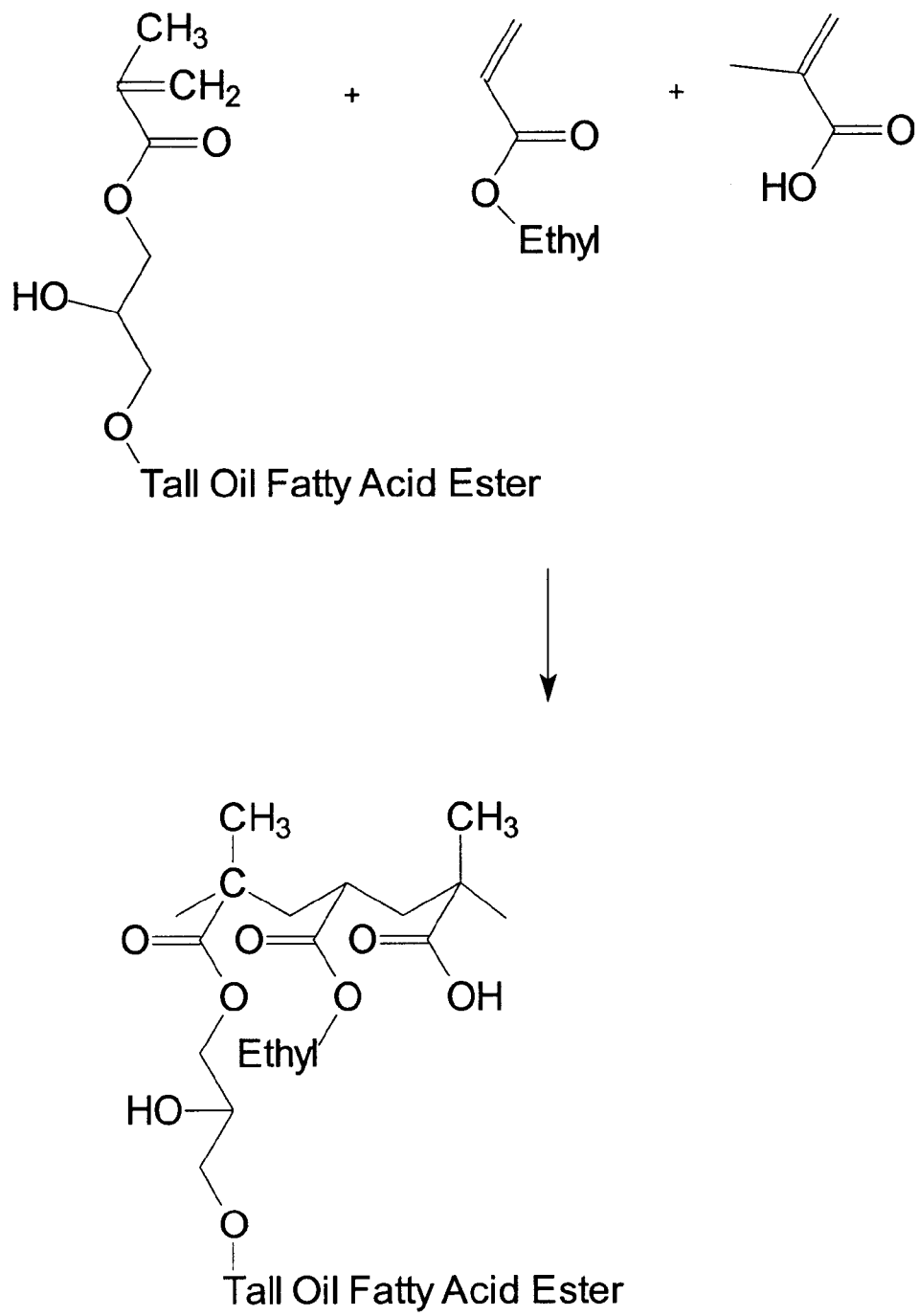
FIG. 1 shows a reaction scheme for introducing pendant hydrophobic moieties onto a polymeric backbone.
Figure 2:
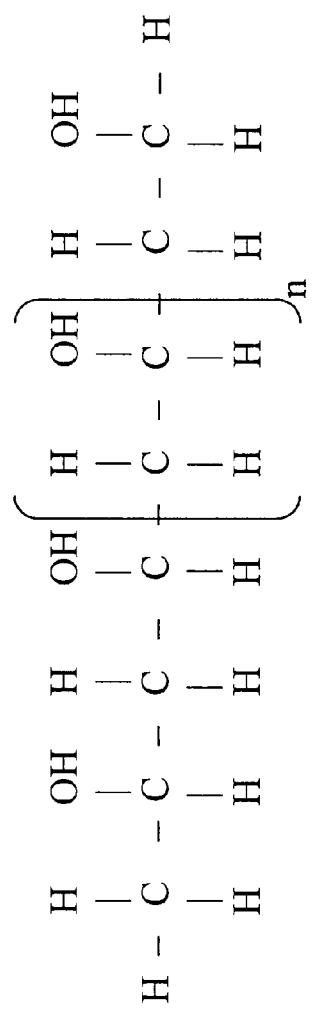
FIG. 2 shows a polymeric backbone containing only carbon atoms.

FIG. 2 shows an all carbon backbone containing 6+2n carbon atoms as might be obtained from the free radical initiated polymerisation and subsequent hydrolysis of vinyl acetate to give a notional polyvinyl alcohol. The chain terminating groups are arbitrarily shown as hydrogen atoms. Pendant hydrophobic moieties could be attached to the backbone by condensation with hydroxyl groups.

Figure 3:
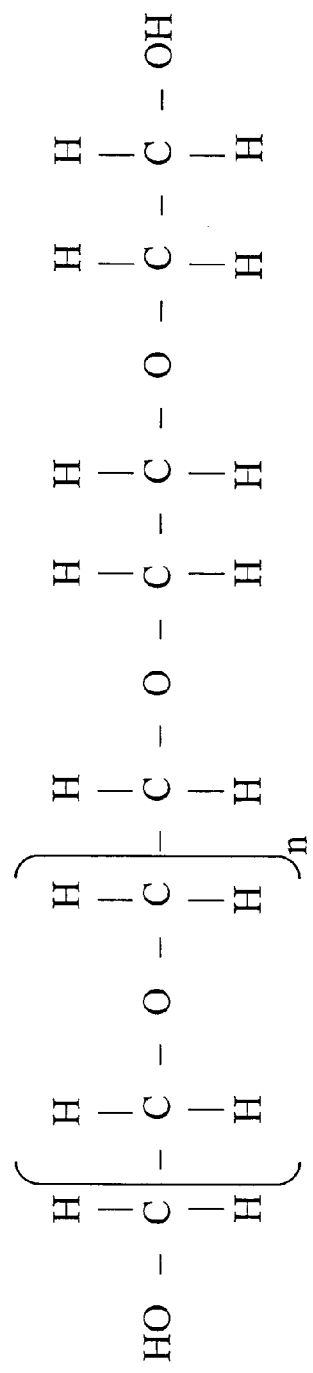
FIG. 3 shows a polymeric backbone containing both carbon and oxygen atoms.

FIG. 3 shows a carbon and oxygen backbone containing 6+2n carbon atoms and 2+n oxygen atoms. Again hydroxyl groups could be used for the attachment of hydrophobic groups.

Figure 4:
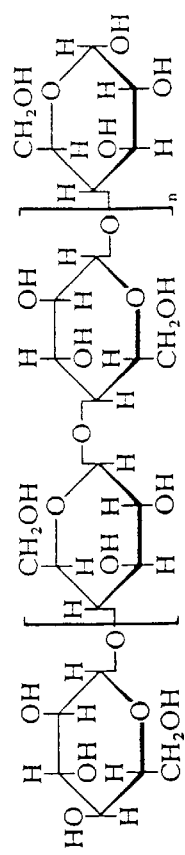
FIG. 4 shows a polymeric backbone containing both carbon and oxygen atoms in heterocyclic rings.

FIG. 4 shows a bifurcated backbone chain in which one loop of the chain comprises only carbon atoms and the other comprises carbon atoms and an oxygen atom. All carbon and oxygen atoms in this heterocyclic bifurcation are counted in making up the molecular weight of the backbone. Backbones of this type occur in cellulosic thickeners.

Figure 5:
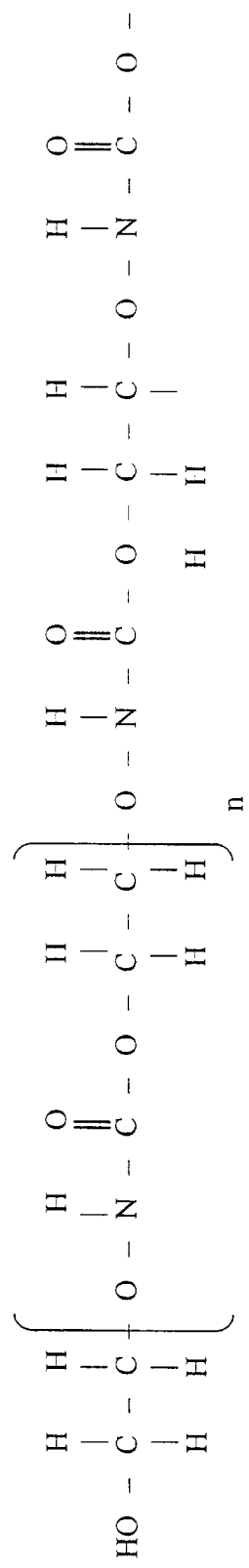
FIG. 5 shows a polymeric backbone containing carbon, oxygen and nitrogen atoms.

FIG. 5 shows a backbone comprising carbon, oxygen and nitrogen atoms as is found in ethoxylate urethanes.

What is claimed is:

1. A thickened aqueous coating composition of a chosen pH comprising: a polymeric binder; a macromolecular thickener comprising:
    a) macromolecules having moieties which are hydrophilic at the chosen pH;
    b) wherein the thickener on dispersion in water at a concentration of 2 wt %, based on the combined weights of the thickener and water, has a low shear viscosity of at least 0.1 Pa.sec when measured at 18° C. on a Brookfield viscometer using a No. 3 Spindle rotating at 12 rpm;
    wherein the macromolecules also contain autoxidisable moieties thereby creating an autoxidisable thickener; and
    wherein the number of average particle size of the thickener is below 500 nm.

2. A composition according to claim 1 wherein the composition contains a drier which catalyses autoxidation of the autoxidisable moieties.

3. A composition according to claim 1 wherein the autoxidisable moieties are provided by derivatives of long chain unsaturated fatty acids.

4. A composition according to claim 1 wherein the autoxidisable moieties are provided by a copolymerised diester comprising a hydroxypropylene divalent radical.

5. A composition according to claim 1 wherein the autoxidisable moieties are provided by a copolymerized diester comprising a polyether divalent radical.

6. A composition according to claim 1, wherein the macromolecules contain copolymerised styrene or an analogue of styrene.

7. A composition according to claim 1 wherein the composition contains a polyunsaturated compound.

8. A composition according to claim 7 wherein the polyunsaturated compound contains polybutadiene moieties.

9. A composition according to claim 1 wherein the composition contains more than 3 wt % (based on the total weight of the composition) of the thickener.

10. A composition according to claim 1 wherein the composition contains less than 30% by volume of solid particles.

11. A thickened aqueous coating composition of a chosen pH which contains a polymeric binder and a macromolecular thickener:
    a) which thickener contains macromolecules having moieties which are hydrophilic at the chosen pH; and
    b) which thickener on dispersion in water at a concentration of 2 wt % (based on the combined weights of the thickener and water) has a low shear viscosity of at least 0.1 Pa.sec when measured at 18° C. on a Brookfield viscometer using a No. 3 Spindle rotating at 12 rpm;
    wherein the macromolecules also contain autoxidisable moieties thereby creating an autoxidisable thickener; and
    wherein the number of average particle size of the thickener is below 350 nm.

12. A thickened aqueous coating composition of a chosen pH which contains a polymeric binder arid a macromolecular thickener:
    a) which thickener contains macromolecules having moieties which are hydrophilic at the chosen pH; and
    b) which thickener on dispersion in water at a concentration of 2 wt %, based on the combined weights of the thickener and water, has a low shear viscosity of at least 0.1 Pa.sec when measured at 18° C. on a Brookfield viscometer using a No. 3 Spindle rotating at 12 rpm;
    wherein the macromolecules also contain autoxidisable moieties thereby creating an autoxidisable thickener; and
    wherein the autoxidisable moieties are provided by a copolymerised diester comprising a polyether divalent radical.

13. A thickened aqueous coating composition of a chosen pH which contains a polymeric binder and a macromolecular thickener:
    a) which thickener contains macromolecules having moieties which are hydrophilic at the chosen pH; and
    b) which thickener on dispersion in water at a concentration of 2 wt % (based on the combined weights of the thickener and water) has a low shear viscosity of at least 0.1 Pa.sec when measured at 18° C. on a Brookfield viscometer using a No. 3 Spindle rotating at 12 rpm;
    wherein the macromolecules also contain autoxidisable moieties thereby creating an autoxidisable thickener; and
    wherein the polyunsaturated compound contains polybutadiene moieties.

14. A process for making a thickened aqueous coating composition of a chosen pH which contains a polymeric binder and a macromolecular thickener comprising:
    subjecting co-monomers which make up the polymeric backbone of the macromolecular thickener to intensive agitation;
    wherein the macromolecular thickener comprises:
    a) macromolecules having autoxidisable moieties which are hydrophilic at the chosen pH; and
    b) which thickener on dispersion in water at a concentration of 2 wt %, based on the combined weights of the thickener and water, has a low shear viscosity of at least 0.1 Pa.sec when measured at 18° C. on a Brookfield viscometer using a No. 3 Spindle rotating at 12 rpm.

15. A process for making a thickened aqueous coating composition of claim 14 wherein the number average particle size of the thickener is below 500 nm.

16. An aqueous thickener dispersion of chosen pH for use in coating compositions comprising:
    a) macromolecules having moieties which are hydrophilic at the chosen pH; and b) which thickener on dispersion in water at a concentration of 2 wt % (based on the combined weights of the thickener and water) has a low shear viscosity of at least 0.1 Pa.sec when measured at 18° C. on a Brookfield viscometer using a No. 3 Spindle rotating at 10 rpm;

wherein the macromolecules also contain autoxidisable moieties thereby creating an autoxidisable thickener; and wherein the number average particle size of the thickener is below 500 nm.

17. An architectural paint, lacquer, varnish or adhesive comprising a thickened aqueous coating composition of a chosen pH comprising:

a polymeric binder and a macromolecular thickener, the thickener comprising:

a) macromolecules having moieties which are hydrophilic at the chosen pH; and b) wherein the thickener on dispersion in water at a concentration of 2 wt %, based on the combined weights of the thickener and water, has a low shear viscosity of at least 0.1 Pa.sec when measured at 18° C. on a Brookfield viscometer using a No. 3 Spindle rotating at 12 rpm;

wherein the macromolecules also contain autoxidisable moieties thereby creating an autoxidisable thickener; and wherein the thickened aqueous coating composition contains over 3 wt % of a thickener.

18. The architectural paint lacquer, varnish or adhesive of claim 17 wherein the number average particle size of the thickener is below 500 nm.

* * * * *